United States Patent
Baum et al.

(10) Patent No.: US 7,616,738 B2
(45) Date of Patent: Nov. 10, 2009

(54) TELEPHONE LINE DIALER AND EMERGENCY CALL SYSTEM

(75) Inventors: Elliot Baum, Dix Hills, NY (US); Gilbert I. Starr, New Rochelle, NY (US)

(73) Assignee: Telemergency Systems LLC, Ronkonkoma, NY (US)

( * ) Notice: Subject to any disclaimer, the term of this patent is extended or adjusted under 35 U.S.C. 154(b) by 805 days.

(21) Appl. No.: 11/356,519

(22) Filed: Feb. 17, 2006

(65) Prior Publication Data
US 2007/0206729 A1    Sep. 6, 2007

(51) Int. Cl.
*H04M 11/04* (2006.01)
(52) U.S. Cl. ................................... 379/45; 455/404.1
(58) Field of Classification Search .................. 349/47, 349/52; 340/601
See application file for complete search history.

(56) References Cited

U.S. PATENT DOCUMENTS

| | | | |
|---|---|---|---|
| 4,371,751 | A | 2/1983 | Hilligoss, Jr. et al. |
| 4,492,820 | A * | 1/1985 | Kennard et al. ............... 379/46 |
| 5,333,172 | A | 7/1994 | Stevens |
| 5,673,304 | A | 9/1997 | Connor et al. |
| 5,742,666 | A | 4/1998 | Alpert |
| 6,060,979 | A | 5/2000 | Eichsteadt |
| 6,212,260 | B1 | 4/2001 | Baum et al. |
| 6,574,484 | B1 | 6/2003 | Carley |
| 6,614,883 | B2 | 9/2003 | Baum et al. |
| 2001/0028310 | A1 * | 10/2001 | Tuttle .......................... 340/601 |
| 2005/0048945 | A1 | 3/2005 | Porter |
| 2005/0282518 | A1 | 12/2005 | D'Evelyn et al. |

FOREIGN PATENT DOCUMENTS

| | | |
|---|---|---|
| JP | 08-130589 A | 5/1996 |
| WO | WO 92/14333 A1 | 8/1992 |
| WO | WO 98/53624 A1 | 11/1998 |

OTHER PUBLICATIONS

U.S. Appl. No. 11/423,872, filed Jun. 13, 2006, Inventor: Eliott Baum, Title of Invention: Speakerphone Co0ntrol Techniques and Emergency Call Systems.

* cited by examiner

*Primary Examiner*—Curtis Kuntz
*Assistant Examiner*—Maria El-Zoobi
(74) *Attorney, Agent, or Firm*—Frishauf, Holtz, Goodman & Chick, P.C.

(57) ABSTRACT

Emergency call system by which a caller can automatically call other parties to leave an emergency message, includes an emergency call unit having a memory for storing telephone numbers to be called and the emergency message, an emergency key, and a microprocessor for controlling storage of the numbers and emergency message in the memory, setting each number to be dialed in sequence, delay dialing of each number for a period of time (without first detecting a dial tone) to assure that an outgoing call can be made on the telephone line, and dialing the numbers in sequence upon activation of the emergency key. The emergency call unit starts a transmission of the emergency message to the dialed number to automatically advise of an emergency after a predetermined time after the number has been dialed and no busy signal has been detected during a predetermined time period.

22 Claims, 11 Drawing Sheets

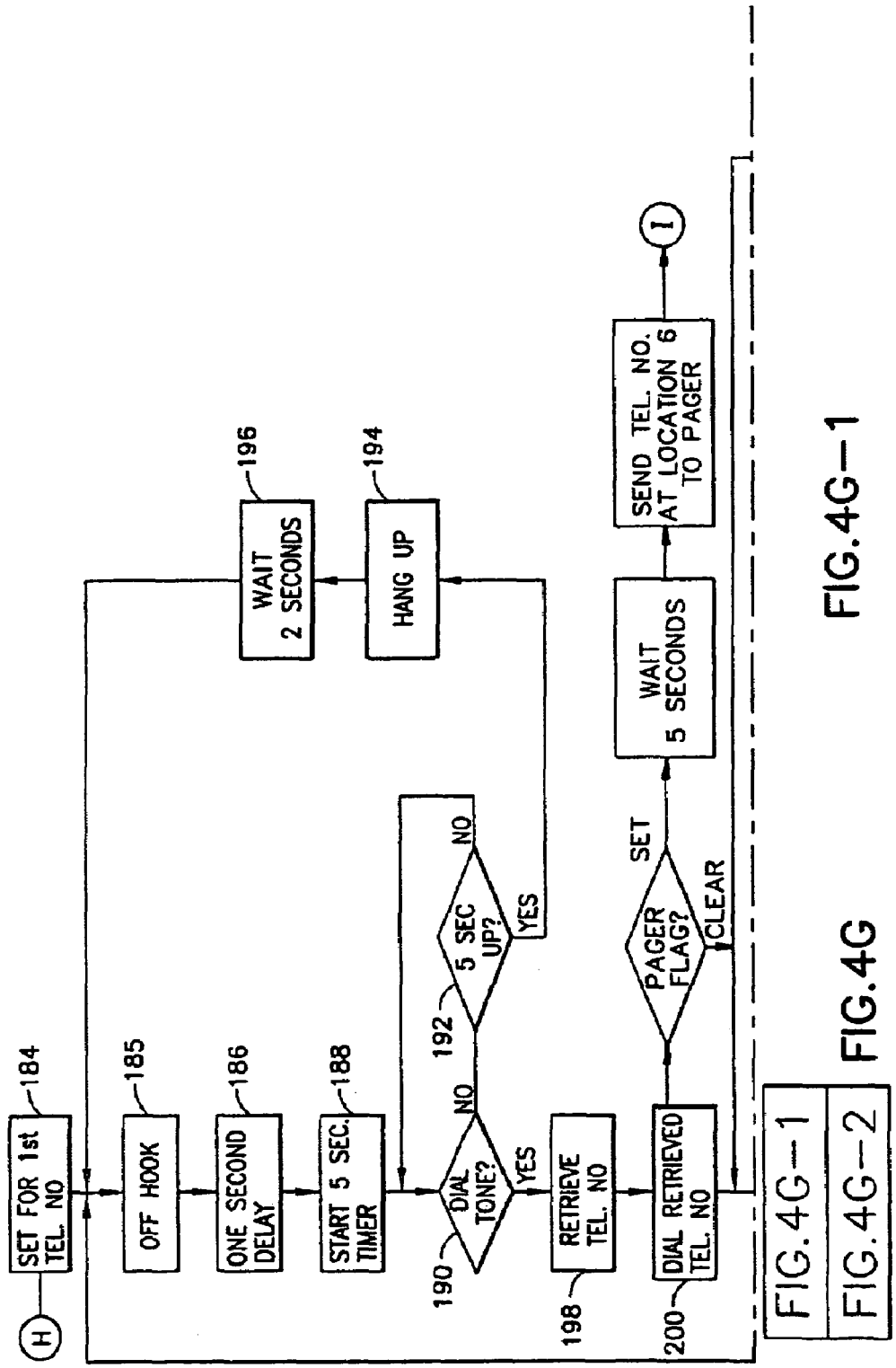

TELEPHONE LINE DIALER AND EMERGENCY CALL SYSTEM

FIELD OF THE INVENTION

The present invention relates generally to a telephone line dialer which initiates calls on the telephone line without detecting a dial tone.

The present invention also relates to emergency call systems, and in particular, to an emergency call system for aiding persons in distress, for example, due to medical, fire, burglary or other emergencies.

BACKGROUND OF THE INVENTION

Emergency call systems are known in which a person in distress can get immediate help. Specifically, in such systems, the person presses a button on a pendant which transmits a signal to an alarm in the person's house. The alarm then sends a signal to a central station, and a person at the central station must then dial the telephone numbers from a prescribed list in order to obtain aid for the distressed person.

However, such an arrangement is relatively complicated and costly. Specifically, such arrangement operates in a similar manner to a central burglar or fire alarm in a house, and requires a separate, complicated wiring assembly for the house, at a considerable cost. Also, such a system requires that a central station be provided, and therefore, the subscriber to such a system must pay a monthly fee for such service, adding further to the cost of the system.

Also, a problem with known systems is that if a central station, upon calling a telephone number of attempts, so that the person in distress does not receive aid.

Emergency call systems have therefore been invented which are connected to the telephone line and enable a caller to automatically call a plurality of other parties to leave an emergency message, sometimes, simply by pressing a button.

Examples of such emergency call systems are disclosed in U.S. Pat. Nos. 6,212,260 and 6,614,883, incorporated by reference herein, wherein the emergency call systems include an emergency call unit having a memory for storing telephone numbers to be called and an emergency message, an emergency key, and a microprocessor for controlling storage of the telephone numbers and emergency message in the memory, after the dial tone is obtained, dialing the telephone numbers in sequence upon activation of the emergency key, starting a transmit of the emergency message to the dialed telephone number to automatically advise of an emergency after a predetermined time after the telephone number has been dialed and no busy signal has been detected during a predetermined time period, and restarting the transmit of the emergency message to the dialed telephone number to automatically advise of an emergency after detecting each ring-back from each telephone number.

It is now desirable to provide an emergency call system which has a mode of operation which does not require detection of a dial tone to initiate dialing of the telephone numbers, this mode being addition or alternative to operation of the emergency call system using dial tone detect as disclosed in the '260 and '883 patents.

OBJECTS AND SUMMARY OF THE INVENTION

Accordingly, it is an object of the present invention to provide an emergency call system that improves on the emergency call systems disclosed in U.S. Pat. Nos. 6,212,260 and 6,614,883 while still achieving the advantages of those emergency call systems, i.e., eliminating the requirement for a central station, eliminating the requirement for a separate wiring of the person's house, enabling its use with a conventional telephone line, enabling continuously calling of predetermined telephone numbers until an acknowledgment is received, and which is inexpensive and easy to make, install and operate.

It is another object of the present invention to provide a new and improved emergency call system which is designed to dial preset telephone numbers without first waiting to detect the presence of a dial tone on the telephone line to which the emergency call system is connected.

It is still another object of the present invention is to provide a telephone line dialer connected to a telephone line and which initiates calls on the telephone line without detecting a dial tone, yet assures that a call made using the dialer will be completed.

In accordance with one aspect of the present invention, an emergency call system by which a caller can automatically call a plurality of other parties to leave an emergency message in accordance with the invention includes an emergency call unit including a memory for storing a plurality of telephone numbers to be called and at least one emergency message, an input/output device for connecting the emergency call unit for making a telephone call, at least one emergency key, and a microprocessor connected with the memory, the emergency key(s) and the input/output device. The microprocessor controls storage of the plurality of telephone numbers to be called and the emergency message in the memory, sets each telephone number to be dialed in sequence, and dials the telephone numbers in sequence upon activation of the emergency key(s). Before dialing each telephone number, the microprocessor can without first detecting a dial tone, delay dialing of each telephone number for a period of time to assure that an outgoing call can be made on the telephone line.

The delay in dialing can be a-two-phase delay to account for the possibility of a previous call not being effectively terminated by the calling party and the possibility of an incoming call being made to the line during the dialing routine. In the first case, the microprocessor determines whether a first predetermined period of time has elapsed or a ring signal is detected and enables each of the telephone numbers to be dialed, without first detecting a dial tone, only after the first period of time has elapsed or the ring signal has been detected. The first period of time may be a time set by the telephone company to enable a call terminated by the called party to resume, e.g., a sixteen second time period. In the second case, the microprocessor monitors the telephone line for silence, after determining whether the first predetermined period of time has elapsed or the ring signal has been detected, and enables each of the telephone numbers to be dialed only after a period of silence is detected based on the duration of a quiet portion of the ring signal sequence. The period of silence should be sufficiently larger than the typical four second quiet portion of a six second ring signal to ensure that no incoming call is being received.

Various situations arising during usage of the emergency call unit and the telephone or devices associated with the same line are possible and dealt with in accordance with the invention to ensure the ability to make an outgoing call. For example, when an incoming call to the line of the emergency call unit is answered and then terminated, the first delay is required to take care of the possibility of the calling party not hanging up and remaining in control of the line as permitted by the telephone company (referred to as "calling party control"). After the first delay, the second delay is required to ensure the absence of another incoming call. If a ring tone is detected after the first delay, then the emergency call unit must continue to monitor the line for additional ring signals until the time for the second delay, i.e., a period of silence on the line, has elapsed. Only at that time, can the emergency call unit effectively seize the line and place the first emergency call. Satisfaction of both delay conditions should insure that the line is clear to make an outgoing call.

Another embodiment of an emergency call system in accordance with the invention includes in addition to a memory, input/output device and one or more emergency keys as described above, a first speaker and a first microphone through which a caller can communicate with the called party, a second speaker and a second microphone through which a called party can communicate with the caller, and a microprocessor which controls storage of the plurality of telephone numbers to be called and the emergency message(s) in the memory, sets each telephone number to be dialed in sequence, without first detecting a dial tone, delays dialing of each telephone number for a period of time to assure that an outgoing call can be made on the telephone line, and dials the telephone numbers in sequence upon activation of the emergency key(s). The microprocessor can generate the delay in the general manner described above.

In another embodiment of an emergency call system in accordance with the invention, which may but is not required to include the delay routine described above, the microprocessor is arranged to turn a speakerphone off when the telephone is on hook and a call is in progress on the telephone line upon activation of the emergency key(s), and then proceed with the delay in dialing. This can be accomplished electronically.

In yet another embodiment of an emergency call system in accordance with the invention, which may but is not required to include the delay routine or speakerphone shutoff routine described above, the microprocessor is arranged to detect an off hook condition upon activation of the emergency key(s) and electronically bypass the handset and then proceed with the delay in dialing.

In still another embodiment of an emergency call system in accordance with the invention, which may but is not required to include the delay routine, speakerphone shutoff routine or handset bypass routine described above, the microprocessor is arranged to detect an off hook condition and upon detection thereof, activate a speakerphone after completion of the dialing sequence to enable reception of incoming calls. Thus, incoming calls can be received in spite of the off hook handset.

A dialer for making an outgoing call in accordance with the invention includes a housing and a communications unit arranged in the housing and coupled to the telephone line. The communications unit includes a microprocessor arranged to receive a command to initiate an outgoing call on the telephone line to a telephone number, without first detecting a dial tone, delay dialing of the telephone number for a period of time to assure that the outgoing call can be made on the telephone line, and then dial the telephone number after the delay. The microprocessor can generate the delay in the general manner described above for the emergency call systems in accordance with the invention.

The above and other objects, features and advantages of the present invention will become readily apparent from the following detailed description thereof which is to be read in connection with the accompanying drawings.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
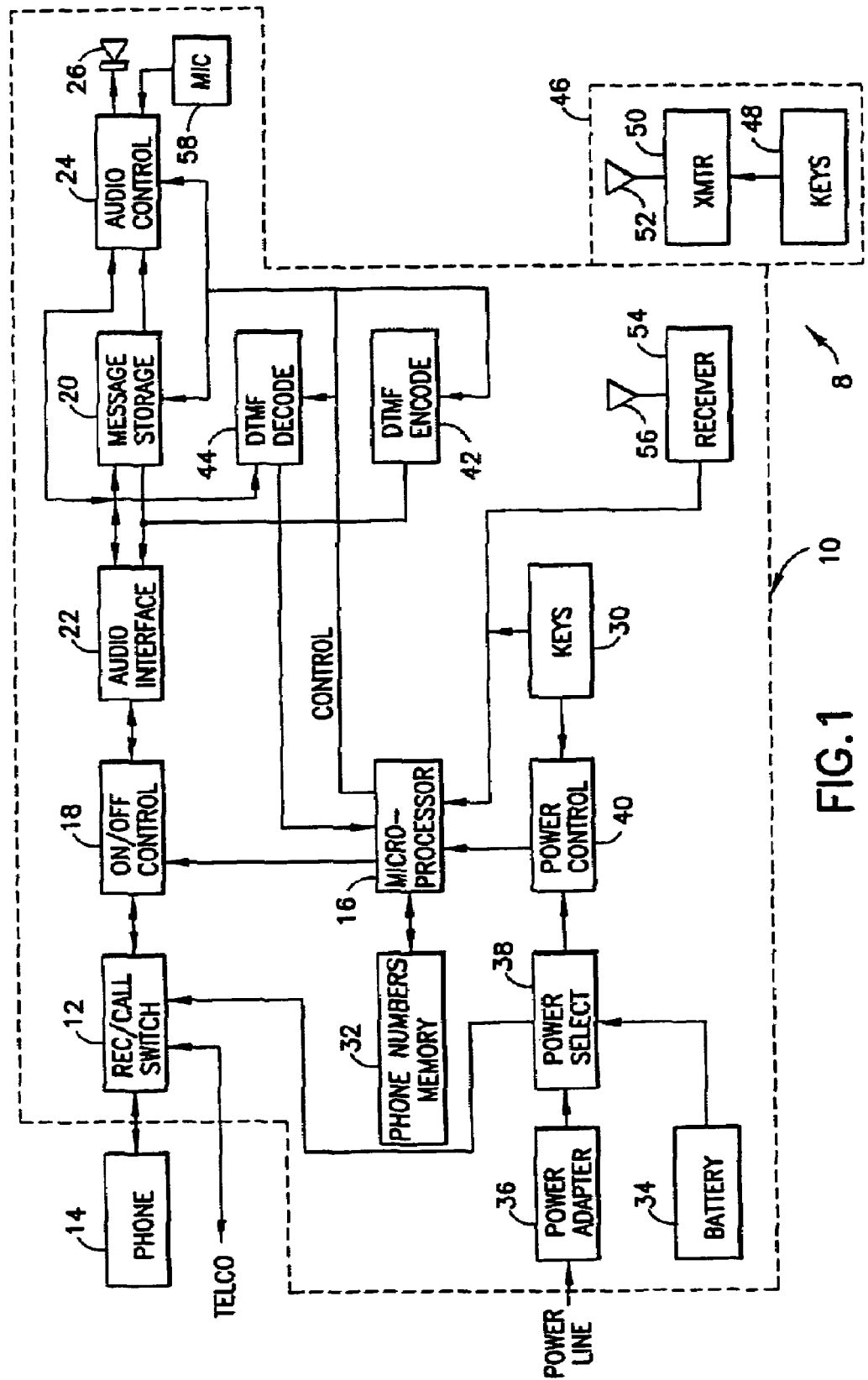
FIG. 1 is a block diagram of the emergency call system according to the present invention.

The present invention utilizes in large part the emergency call system disclosed in U.S. Pat. Nos. 6,212,260 and 6,614,883. Therefore, the description of the emergency call system in those patents is repeated herein.

Before discussing the present invention with reference to the drawings, a brief overview of the invention will be provided. With the present invention, when a user is in distress or has an emergency, the user depresses a key or button on an emergency call unit or on a pendant that the user is wearing, with the button that is depressed corresponding to the situation. For example, if the user has a medical emergency, the user may depress a key E1 on the pendant. The pendant then transmits a signal to the emergency call unit connected to a telephone line at the location of the user. The emergency call unit proceeds to dial, in sequence, a plurality of, for example, five, preset telephone numbers that are stored in a memory in the emergency call unit, with an optional sixth telephone number being 911. The unit plays a pre-recorded message regardless of whether the called telephone number is answered or not, and then proceeds to call the next telephone number. In addition, the person being called has the option of communicating with the caller, replaying the message or stopping further delivery of the message to subsequent telephone numbers by pressing appropriate keys on the called person's telephone keypad.

Thus, rather than requiring a complicated alarm unit which is hard-wired into the user's house and rather than requiring the use of a central station, the present invention automatically dials preset telephone numbers and delivers an emergency message for help. In the event that nobody is available at any of the called telephone numbers to respond, the unit can then be set to dial the emergency telephone number 911. Alternatively, the emergency telephone number 911 can be dialed at a different time in the sequence, such as the first, second, third or so on number that is dialed.

Referring now to the drawings in detail, an emergency call system 8 according to the present invention includes an emergency call unit 10 having a record/call switch 12 which connects to the telephone line of the telephone company (TELCO) through a conventional telephone jack, and to which an external telephone unit 14 can be connected through a conventional telephone line. Alternatively, telephone unit 14 can be formed integrally within emergency call unit 10. Record/call switch 12 is controlled to switch between a conventional telephone/emergency call use (CALL MODE) via telephone unit 14 in which telephone unit 14 can be operated normally and in which emergency call unit 10 automatically dials various preset telephone numbers during an emergency in order to supply a prerecorded message, and a RECORD MODE in which various telephone numbers and messages can be recorded and whereby telephone unit 14 is used to record and hear messages and insert telephone numbers.

The switching of record/call switch 12 is controlled by a REC/CALL switch on the keypad. ON/OFF control circuit 18 is effectively a power transistor which creates an off hook condition of telephone unit 14, and supplies a signal corresponding thereto to microprocessor 16.

A message storage unit 20 is provided for storing recorded messages and for supplying respective stored messages to the telephone line through an audio interface 22, ON/OFF control circuit 18 and record/call switch 12. In response to activation by a user, microprocessor 16 sends a control signal to message storage unit 20 to cause message storage unit 20 to supply a pre-recorded message to the telephone line when an emergency telephone number is dialed, as will be explained in greater detail hereinafter. Alternatively, a user can play back a recorded message to check the same, and this is also controlled by microprocessor 16 which causes message storage unit 20 to supply the recorded message to an audio control circuit 24, which selects whether the audio message or a DTMF signal is supplied to the speaker, and then supplies the analog signal to a loudspeaker 26 or telephone 14 built into emergency call unit 10.

Figure 2:
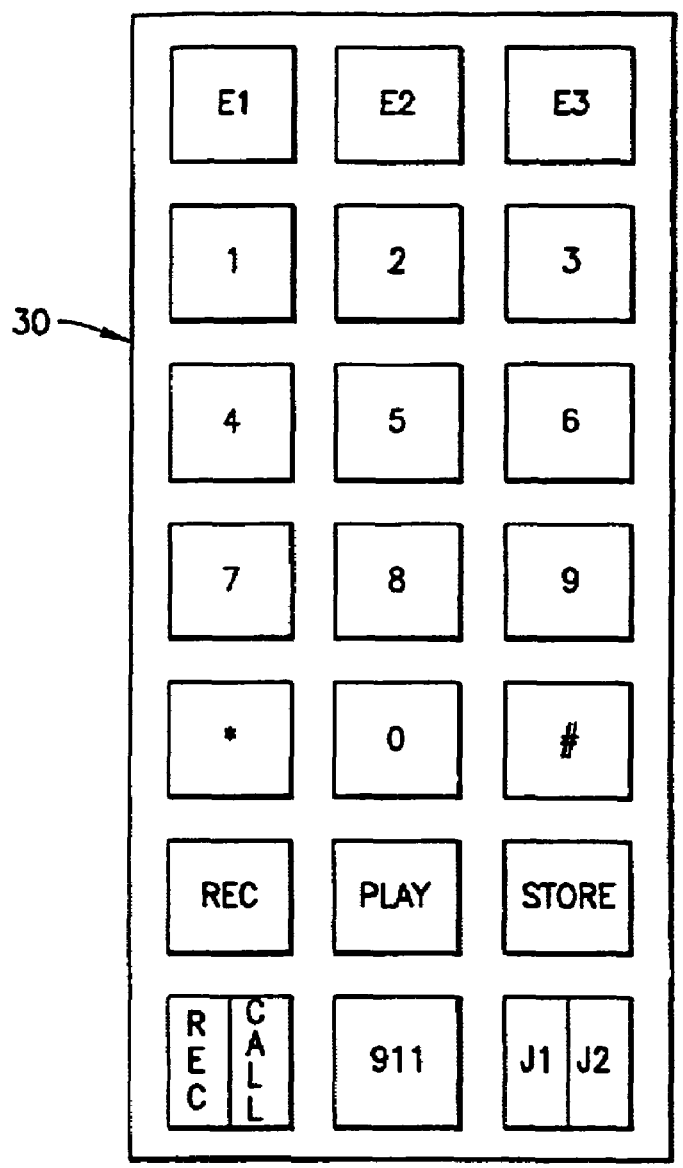
FIG. 2 is a top plan view of a keypad that can be used with the emergency call unit having a telephone incorporated integrally therein.

The upper surface of the housing for emergency call unit 10 contains a keypad 30 with a plurality of keys or buttons, as shown in FIG. 2. Specifically, there is at least one emergency key. In FIG. 2, three emergency keys are shown, namely, key E1 for a medical emergency, key E2 for a fire emergency and key E3 for a burglary emergency. However, the number of keys may vary within the scope of the present invention. Alternatively, one key can be provided which toggles through the different emergency situations, along with a separate send key (not shown) for sending a message corresponding to that key. In such case, as each key is toggled, a message can be played to indicate the particular key.

In addition, there is a record key REC for recording a message to be stored in message storage unit 20, a playback key PLAY for playing back a pre-recorded message storage in message storage unit 20, a store key STORE for storing telephone numbers and a key 911 for selecting an automatic emergency number 911. There is also a REC/CALL toggle key for controlling operation in a RECORD mode or a CALL mode. Keypad 30 is connected with microprocessor 16 for supplying appropriate signals thereto, as will be described hereinafter.

The numeric keys 0-9 and the star (*) key and pound (#) key of telephone unit 14 can be used to enter the appropriate digits and other commands where telephone unit 14 is a separate unit from emergency call unit 10. Alternatively, telephone unit 14 can be formed integrally with emergency call unit 10, and in such case, numeric keys 0-9 and the star (*) key and pound (#) key are formed on keypad 30 of emergency call unit 10, as shown in FIG. 2.

A telephone number memory 32 is also connected with microprocessor 16 and stores a plurality of, for example, up to five telephone numbers, although the number of telephone numbers that can be stored can vary within the scope of the present invention. Alternatively, telephone number member 32 and message storage unit 20 can be combined in a single memory. Reference in the claims to a memory for storing the telephone numbers and emergency messages refers to either a single memory or separate memories.

Power can be supplied to emergency call unit 10 by a battery 34 or a power line via a conventional power adapter 36. The outputs of battery 34 and power adapter 36 are supplied to a power select circuit 38 that selects power adapter 36 as a default, and which selects battery 34 when there is no power from the output of power adapter 36. The output of power select 38 is supplied to a power control circuit 40 that supplies power to microprocessor 16. In addition, power from power select 38 is supplied to record/call switch 12.

When an appropriate key E1, E2 or E3 from keys 30 is depressed, microprocessor starts reading out the telephone numbers one by one from memory 32 and supplying the same to a DTMF encode circuit 42 which then supplies an appropriate DTMF encoded signal for that telephone number to the telephone line through audio interface 22, ON/OFF control 18 and record/call switch 12. At the same time, microprocessor 16 controls message storage unit 20 to read out the appropriate pre-recorded message, which is also supplied to the telephone line through audio interface 22, ON/OFF control 18 and record/call switch 12.

The supply of the message to the called person can occur in any one of three ways, as follows.

In a first mode of operation, the pre-recorded message is read out even while the telephone being dialed is still ringing. For example, the system can wait a predetermined amount of time, for example, 3 seconds, after the telephone number of the called party is dialed. When a person picks up, the pre-recorded message may be in the middle of a message, although the called person has the option to replay the message. The pre-recorded message can be played once for each telephone number, so that the person picking up the telephone merely needs to continue listening to hear the entire message. In this manner, there is no delay from the time that the person answers the telephone. However, it is preferable for the message to be played twice once a telephone is picked up or after an answering machine answers. Since the emergency and pre-recorded instructional messages are played twice, the called party will hear both messages at least once. The advantage of this method is that there is no need for any detection circuit in emergency control unit 10 to detect when a telephone is answered, thereby greatly simplifying the circuitry and rendering system 8 less costly. The called person also has the option of hitting a key to replay the message. In this regard, a jumper toggle key J1/J2 is provided. When depressed to the J1 side, only one message is played, and when depressed to the J2 side, the message is played twice.

In a second mode of operation, the system starts playing the message a short time after the telephone number is dialed and no busy signal is detected in a predetermined time period. The system then detects the ring-back signal from the next ring and starts replaying the selected emergency message a predetermined time, for example, 2 seconds, after the end of the ring-back signal. The reason for not requiring a ring-back detection for the start of the message is that the called person can pick up the telephone before a first ring-back. If the system required a ring-back to start playing the emergency message, no emergency message would ever be played.

In this case, the ring sequence is generally about 2 seconds of ring tone separated by 4 seconds of silence. If nobody answers and a second ring-back signal is detected, the message that is being played is halted, and is then restarted after the same predetermined time of 2 seconds after the detection of the second ring-back signal. This continues until a predetermined number of, for example, five, ring-back signals are detected. At this time, the system determines that there is nobody at the called telephone number that will answer and thereby hangs up and dials the next telephone number on the list. This method has the advantage that none of the message is lost when the telephone is picked up, since the message starts replaying after each ring-back signal is detected. However, the called person does have the option of replaying the message, as described in more detail hereinafter.

The third method of operation relies on the detection of speech from the called party to start the playback of the messages. In this case, the playback may start after a short delay of, for example, 1 or 2 seconds, after the speech is detected. In the event that an answering machine is provided, the system can replay the messages twice after speech is detected. Thus, the first message will be lost to the answering machine since the called party's message will be playing, but the second playback will be recorded on the called party's answering machine. With this method of operation, the system will still detect the ring-back signals and hang up after the detection of five ring-back signals, with the next telephone number then being dialed.

Any conventional speech detection arrangement can be provided, for example, the speech can be detected by the microprocessor based on various factors, such as frequency of the signal, spacings between portions of the signals, etc.

As discussed above, when emergency call unit 10 dials out a telephone number from the telephone numbers stored in memory 32, and a person picks up the telephone, the prerecorded emergency message is played. At such time, the called person can merely listen to the message and then take appropriate action. Alternatively, the called person can request a playback of the message by pressing a predesignated key, such as the "9" key on the person's telephone keypad.

The person can also end the playback of the pre-recorded message and send a signal to emergency call unit 10 to prevent further telephone numbers being dialed, for example, by pressing a predesignated key, such as the "8" key on the person's telephone keypad. Also, the called person can set up a communication with the caller through speaker 26 and a microphone 58 connected with audio control circuit 24, by depressing a predesignated key, such as the "7" key. In such case, the tone for the number 7, 8 or 9 is supplied over the telephone line and through record/call switch 12, ON/OFF control circuit 18 and audio interface 22 to a DTMF decode circuit 44 which decodes the signal and supplies a signal corresponding thereto to microprocessor 16. If the "7" key has been depressed, communication is established between the parties. If the "8" key has been depressed, microprocessor 16 stops the dialing of further telephone numbers. If the "9" key has been depressed, microprocessor 16 controls memory storage to replay the prerecorded message.

As an alternative and more preferred embodiment, if the "8" key is depressed by a called party, the system will continue to dial the remaining telephone numbers once after the called party that depressed the "8" key disconnects. However, if no called party depresses the "8" key, the system will continue to dial all of the telephone numbers in a repeating sequence for a predetermined amount of time, for example, 15 minutes, regardless of whether the message is received by any or all of the called parties. This provides some assurance to the caller in distress that one of the called parties has received and message and will take some action. In other words, it provides an acknowledgment that the message has been received by a live adult party. For example, a message received by an answering machine or a small child is a passive response or answer to the emergency message and is of minimum value in terms of responding to an emergency. Thus, if five answering machines receive the message, the system will still dial the telephone numbers in sequence for the predetermined time in a further attempt to connect with a live person.

As discussed above, if the "7" key has been depressed, communication is established between the parties.

In one mode of operation, the called party controls the speaking and listening. Thus, for example, if the called party thereafter presses "1", the called party can listen for a preset time period, for example, 30 seconds, and if the called party presses "2", the called party can speak for a preset time period, for example, 30 seconds. Any time that "1" is pressed during the aforementioned time periods, the called party starts a new 30 second time period for listening, and if "2" is pressed, the called party starts a new 30 second time period for speaking. The reason that the called party has control over who speaks and who listens is for a number of reasons. First, the caller may be injured and may not be able to press the buttons on the telephone. Also, the caller may be in panic, and a person in panic may not have the frame of mind to determine which button to depress to speak or listen.

In another mode of operation, the operation of speaking and listening is controlled automatically to change over from one to the other after preset periods of time. For example, after the emergency and instructional messages are played out, a beep is provided which indicates that the calling party is permitted to speak for 15 seconds, and then another beep is provided which indicates that the called party is allowed to speak for 15 seconds. Two further 15 second intervals can be provided thereafter, one for the caller and the other for the called party. After the time periods for speaking and listening have expired, the telephone call can be automatically terminated unless the "9" key is depressed by the called party to request a replay of the messages.

In a further embodiment, if a called person depresses "7", both parties can speak to each other for a fixed period of time, or without a time limitation, as with a standard speakerphone. This can occur without an emergency message being played at all.

Figure 3:
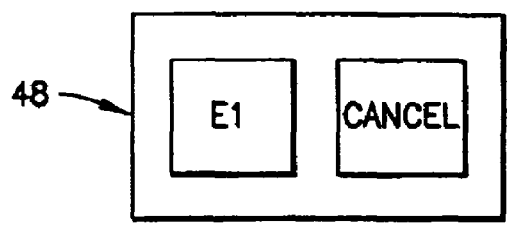
FIG. 3 is a top plan view of a keypad that can be used with the pendant.

Although the present invention has been discussed with reference to the depression of any of keys E1, E2 or E3 on keypad 30, the emergency call system 8 of the present invention can be activated from a location remote from emergency call unit 10. For example, emergency call system 8 can include a pendant 46 or other remote unit worn by the user and having one or a plurality of keys 48. For example, since the only time that a caller may need the pendant is during a medical emergency, only key E1 is preferably provided thereon, as shown in FIG. 3. Alternatively, all three keys E1, E2 or E3 can be provided. In addition, pendant 46 includes a cancel key CANCEL in the event that key E1 is inadvertently depressed, as shown in FIG. 3. A similar key is preferably provided on the main unit also. Cancel key CANCEL can also be used by the caller to shut down the entire system at any time. Pendant 46 includes a transmitter 50 with an antenna 52 which transmits a signal corresponding to the depressed key 48 to a receiver 54 of emergency call unit 10, having an antenna 56. Receiver 54 supplies the received signal directly to microprocessor 16 in order to start the above emergency call operation.

Figure 4A:
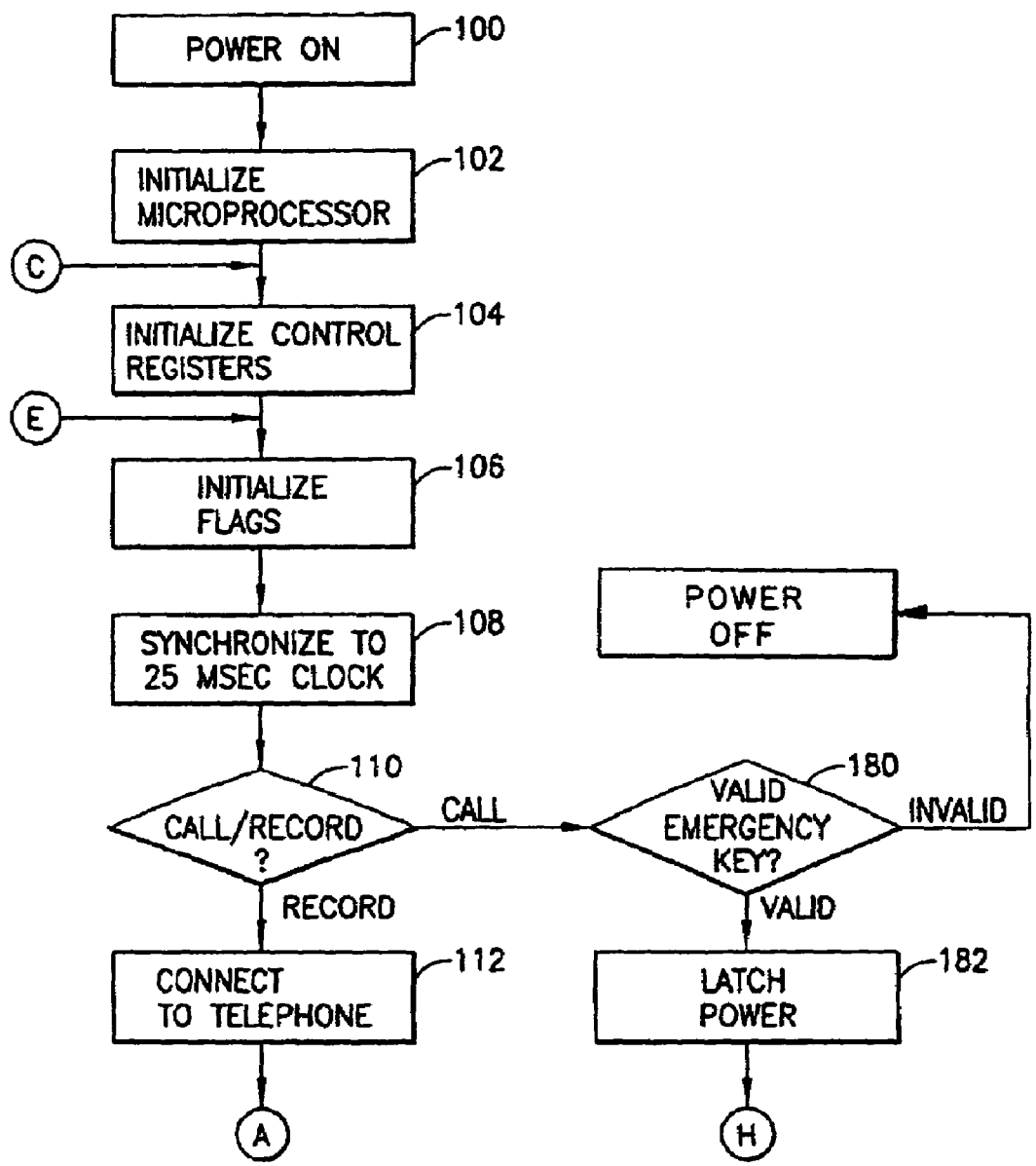
FIGS. 4A-4H are flow chart diagrams of the operation of the emergency call system.

Referring now to the flow chart diagram which continues across FIGS. 4A-4G, and initially to FIG. 4A, it is assumed that power for emergency call unit 10 is turned on and switch REC/CALL is in the CALL position or RECORD position.

In step 100, in the CALL position when one of the emergency keys E1, E2 or E3 is depressed, power is applied to emergency call unit 10 and in the RECORD position, by the toggle switch REC/CALL on the keypad being placed into the RECORD position, power is turned on for the RECORD MODE, whereupon microprocessor 16 is initialized in step 102, followed by initialization of control registers of microprocessor 16 in step 104, that is, the input/output (I/O) of microprocessor 16, and then initialization of flags in the software stored in memory in microprocessor 16 in step 106. Thereafter, microprocessor 16 is synchronized with a 25 msec clock signal in step 108. Microprocessor 16 then determines if the CALL/REC key is in the CALL position or in the RECORD position. In the CALL position, the user can use telephone unit 14 in a conventional manner, and in addition, if one of the emergency keys E1, E2 or E3 is depressed, microprocessor 16 will operate in the CALL MODE. In the RECORD position, telephone unit 14 is disabled from the telephone line, and if one of the keys REC, PLAY, STORE or 911 is depressed, microprocessor 16 will operate in the RECORD MODE, as will be explained hereinafter.

The RECORD MODE will first be described. If the CALL/REC key is placed in the RECORD position, a message can be recorded or played back, telephone numbers can be stored or deleted, and a 911 telephone number can be enabled or disabled. In this mode, emergency call unit 10 is connected with telephone unit 14 to enable use of numeric keys 0-9* and # on telephone unit 14 for recording purposes, in step 1112, in the event that telephone unit 14 is a separate unit.

Figure 4B:
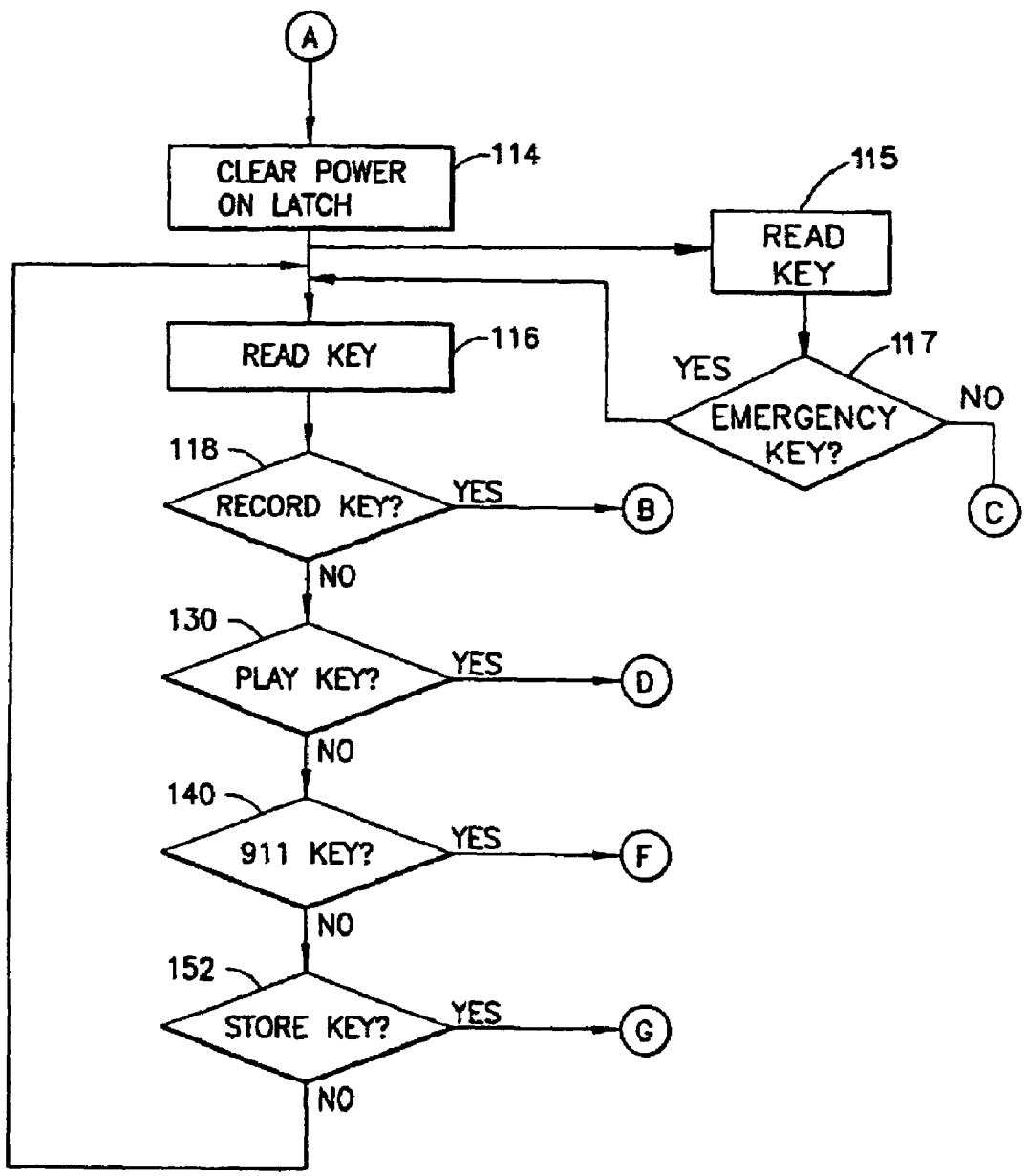
Figure 4C:
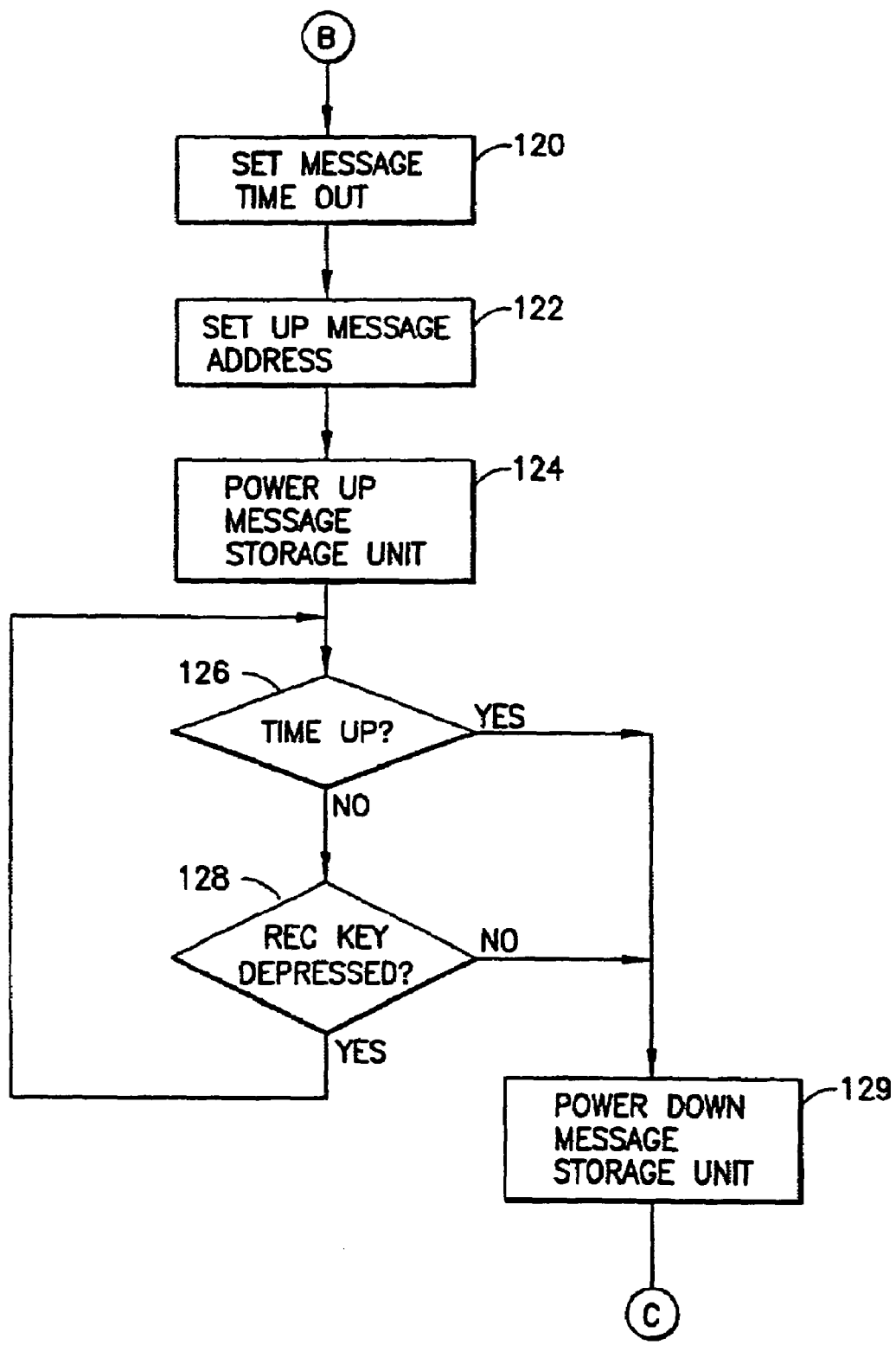
Figure 4D:
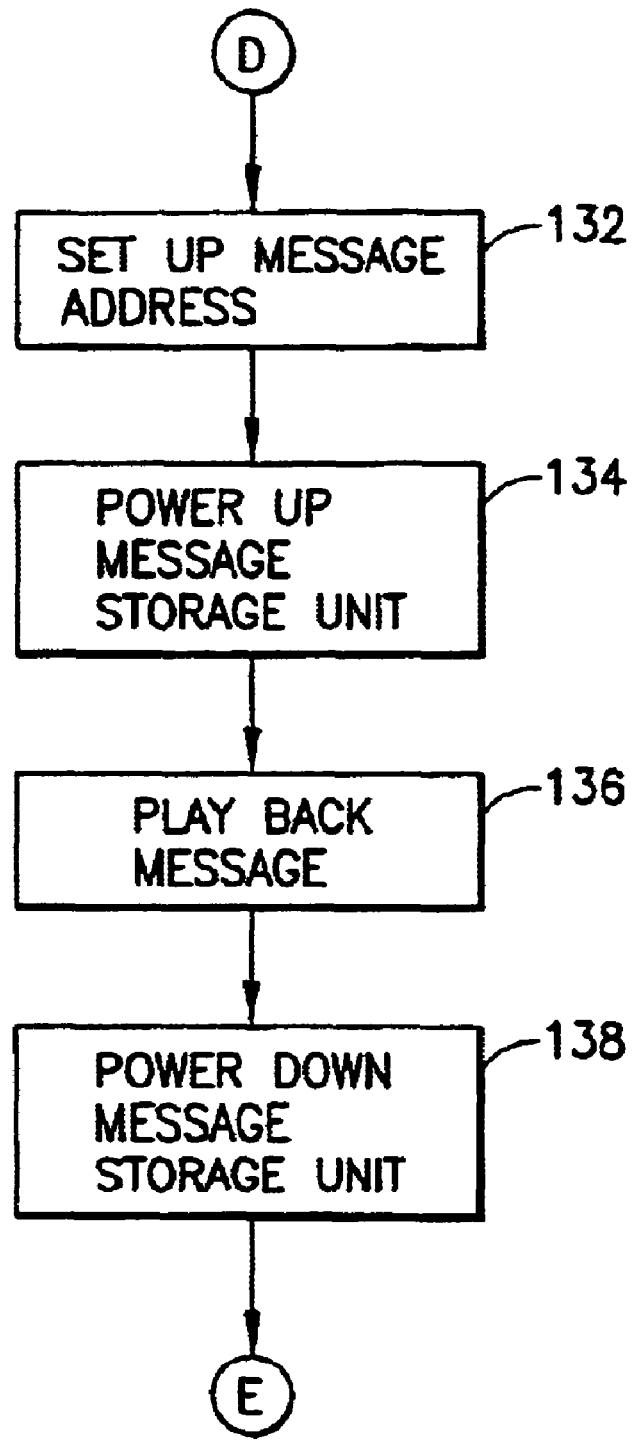
Figure 4E:
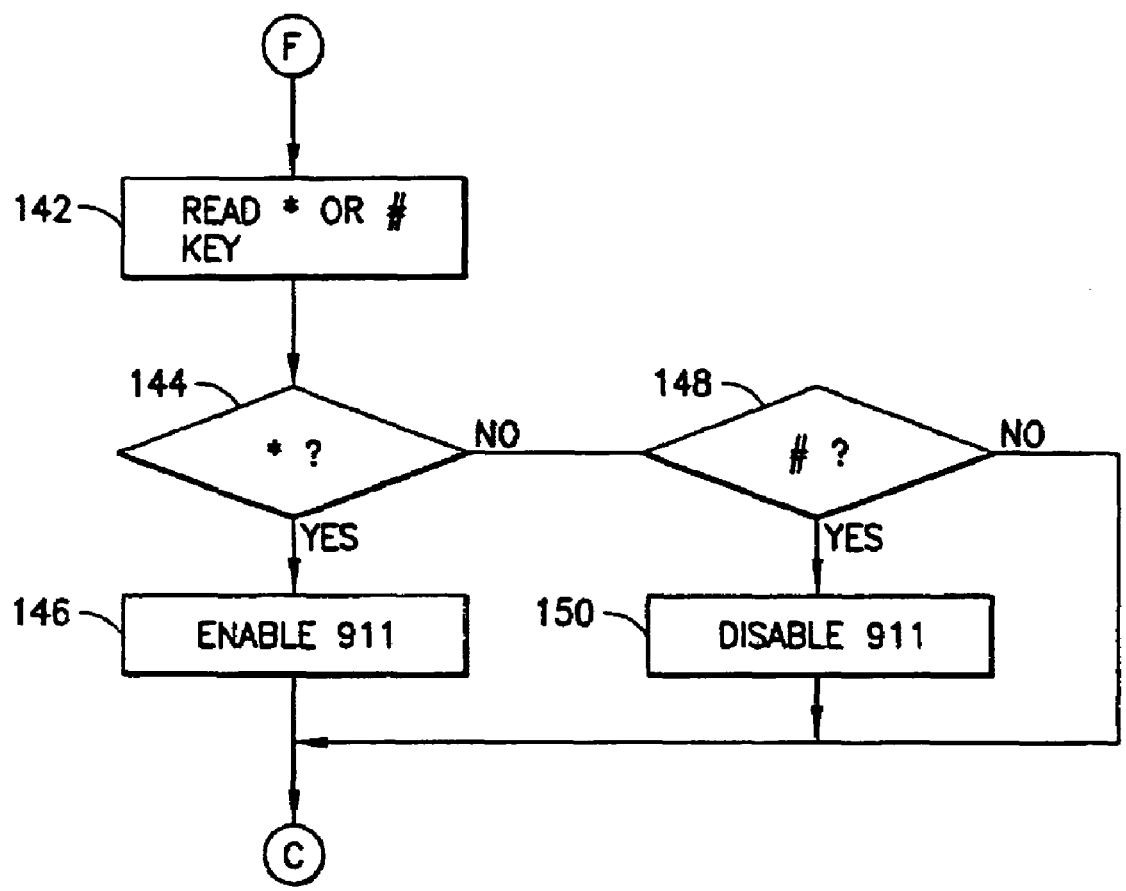

Referring now to FIG. 4B, power to the latch circuit of microprocessor 16 is then cleared in step 114, followed by reading of a depressed key in step 115. It is then detected in step 117 if this depressed key is an emergency key E1, E2 or E3. If yes, the process then continues to reading of one of the keys REC, PLAY, STORE and 911 upon depression of the same, in step 116. If no in step 117, the process returns to step 104. In step 118, it is determined if the key that has been depressed is the record key REC for recording a message to be stored in message storage unit 20. If yes, the process continues to step 120 in FIG. 4C for the sub-process of recording a message to be sent during an emergency.

In step 120, a predetermined message time out is set in microprocessor 16, that is, a maximum length of the message to be recorded. Then, in step 122, the message address is set in message storage unit 20 where the message to be recorded will be stored. This will depend upon which key E1, E2 or E3 was initially depressed. In other words, a first address is used for a message corresponding to key E1, a second address for a message corresponding to key E2 and a third address for a message corresponding to key E3. Thereafter, in step 124, power is supplied to message storage unit 20 in order to begin storing the message. While record key REC is maintained in a depressed condition, the user records the message. In step 126, it is determined if the message time out has been reached. If yes, the recording process is stopped, message storage unit 20 is powered down in step 129 and the process returns to the input of step 104 of FIG. 4A. If not, in step 128, it is determined if the record key REC is still held down. If record key REC is released, the recording operation is completed and the process returns to step 104 after powering down message storage unit 20 in step 129. If the record key REC is still held down, the process returns to the input of step 126 to continue recording the message. This loop continues until there is either a time out in step 126 or the record key REC is released in step 128.

Returning to FIG. 4B, if it is determined that the record key RECORD is not depressed in step 118, the process continues to step 130 where it is determined if the playback key PLAY has been depressed. If yes, the process continues to step 132 in FIG. 4D. Specifically, in step 132, the message address corresponding to the emergency key E1, E2 or E3 that has been depressed, is set up in microprocessor 16. Thereafter, in step 134, power is supplied to message storage unit 20, and then in step 136, there is playback of the stored message from message storage unit 20 corresponding to the emergency key E1, E2 or E3 that has been depressed. After the message has been played back, message storage unit 20 is powered down in step 138. The process then returns to step 106 in FIG. 4A. An alternate implementation is to use a slide switch for enabling or disabling 911.

Returning to FIG. 4B, if it is determined that the playback key PLAY is not depressed in step 130, the process continues to step 140 where it is determined if the key 911 has been depressed. If yes, the user will then depress the star (*) key on telephone unit 14 or the pound (#) key on telephone unit 14 to enable or disable 911 as a telephone number to be called in the event of an emergency. Specifically, microprocessor 16 will read the star (*) or pound (#) key depressed on local telephone 14 in step 142 in FIG. 4E. It is next determined if the star (*) key has been depressed in step 144. If yes, 911 is enabled as a telephone number to be called in the event of an emergency in step 146, and the process returns to step 104 in FIG. 4A. If no, it is next determined if the pound (#) key has been depressed in step 148. If yes, 911 is disabled as a telephone number to be called in the event of an emergency in step 150, and the process returns to step 104 in FIG. 4A. If no, the process returns to step 104 in FIG. 4A.

Returning to FIG. 4B, if it is determined that the key 911 is not depressed in step 140, the process continues to step 152 where it is determined if the store key STORE has been depressed, in order to store telephone numbers to be dialed in the event of an emergency. If no, the process returns to step 116 where the above processes are repeated.

Before discussing the following steps, it is noted that the system can be used to dial a telephone number of a residence, central location or the like to leave an audio message, and can also send the caller's telephone number to a pager, rather than leaving an audio message. An arrangement is required to distinguish between the two, so that the system knows when to send an audio message and when to send a pager telephone number. Generally, as will now be discussed in relation to FIG. 4, after the initial entering of the storage operation, a telephone number to be dialed for leaving an audio message or a telephone number to a pager is stored in any of five locations 1-5.

The caller sets the telephone numbers for leaving an audio message by first entering the storage location 1-5, followed by depression of the pound (#) key, followed by entering of the telephone number to be dialed, and finally ending by depressing the pound (#) key again, that is, the sequence includes (storage location 1-5), # (telephone number), #. For setting a pager telephone number, after the initial entering of the storage operation in step 152, the caller sets this telephone number by first depressing the pound (#) key, followed by the storage location 1-5, followed by depressing the pound (#) key again, followed by entering of the pager telephone number to be dialed, and finally ending by depressing the pound (#) key again. The telephone number that is sent to the pager is the caller's telephone number which the caller sets in the system in location 6. In other words, for a pager operation, the distinction is the depression of the pound key (#) before the storage location.

Figure 4F:
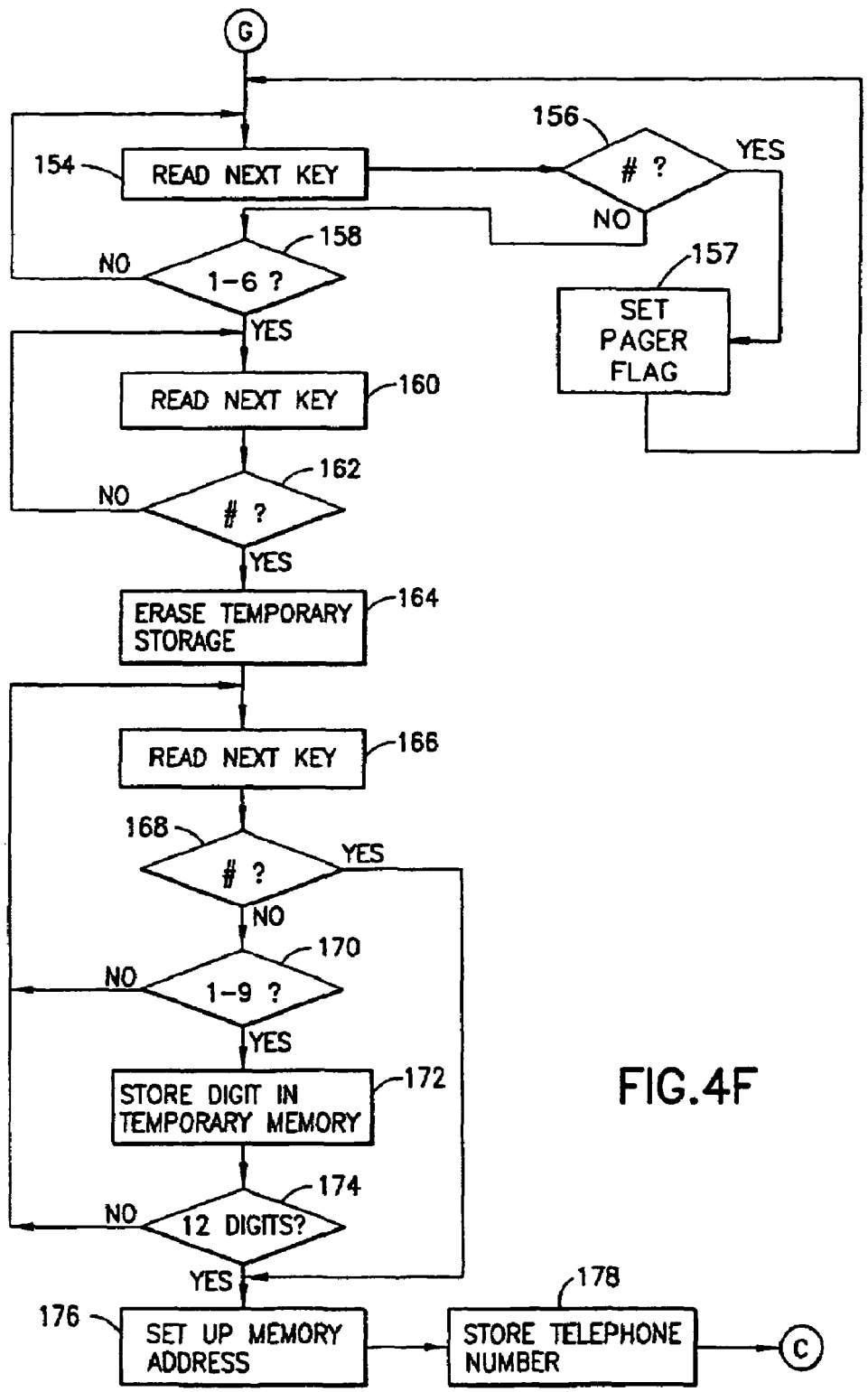

Thus, if yes in step 152, the user will then depress a key in step 154 in FIG. 4F. In step 156, it is detected if this is the pound (#) key that has been depressed in order to set a pager telephone number. If yes in step 156, a pager flag is set in step 157 to denote that the number to be stored is a pager number to be dialed. The process then returns to step 154 where the user again depresses a key. In step 156, it is detected if the key is a pound (#) key. Since it will be a number key, the process continues to step 158 where it is detected whether the depressed key is a number from 1 through 6. If no, the process returns to step 154. If the user depresses 1-5, this corresponds to a storage location for a telephone number to be dialed. If the user depresses 6, this corresponds to the telephone number of the user to be sent to the pager. If yes, in the next step 160, microprocessor 16 retrieves the next depressed key by the user, and then, in step 162, determines if this key is the pound (#) key. If not, the process returns to step 160 until the user presses the pound (#) key. If yes, any telephone number stored in a temporary storage area is erased during the next step 164. The next key that is depressed is then read in step 166, and in step 168, it is determined if this key is the pound (#) key. If not, it is determined if the depressed key is a numeric key 0-9 in step 170. If not, the process returns to step 166. If yes, however, the process continues to step 172 where the digit 0-9 corresponding to the depressed key is stored in a temporary memory buffer. In the next step 174, it is then determined if eleven digits have been read. If not, the process returns to step 166 to read the next depressed key.

The process for reading all of the digits for a particular telephone number ends either when the pound key(#) is depressed as the next key in step 166 and detected in step 168, or when twelve digits or however many digits the telephone system requires, have been read, as detected in step 174. Thereafter, an address in memory 32 is obtained for storing the digits of the telephone number (1-6) in step 176, and the digits for that telephone number are stored in memory 32 at that address in step 178. The process then returns to step 104 in FIG. 4A.

Thus, with the present invention, a first telephone number which provides an audio message to a called telephone is inserted by the keys 1-5, #, phone number, #, while a telephone number which dials a pager number is inserted by the keys #, 1-5, #, phone number, #. If the user makes a mistake while entering a telephone number, the user can depress the star (*) key to reset the operation for re-inputting the telephone number and location.

It will be appreciated that there is a variation in the method of operation of different paging systems. Some systems will provide a single ring-back tone followed by three or four beeps. Others only provide the three or four beeps. It may not be necessary to detect the beeps at all. The present invention looks for a ring-back. If none is found, the caller's telephone number will be sent to the pager after a delay of, for example, approximately 5 seconds. In this regard, it is pointed out that the time between ring-back tones is four seconds.

To delete a telephone number from memory 32, the first key that is depressed and read in step 166, before any digit is read, is the pound (#) key. This is detected in step 168. Since no digits have been entered, the telephone number corresponding to the location (1-6) is cleared and no new number is stored in place thereof, thereby effectively deleting the telephone number from memory 32.

The above operations describe the RECORD mode in which the emergency messages and telephone numbers are recorded or deleted.

For the CALL MODE, REC/CALL switch 12 is set to the CALL MODE by toggle key REC/CALL on keypad 30, and this is sensed in step 110. In this mode, one of the three emergency calling dialing and message playing sequences is initiated by depressing one of the three emergency call keys E1, E2 or E3 either on emergency call unit 10 or on pendant 46. Thereafter, emergency call unit 10 will automatically dial the associated set of five telephone numbers, plus 911 if this is enabled. When dialing starts, a recognition signal, such as a tone or voice, is provided to the caller to acknowledge the operation of the system. After each telephone number is dialed, the associated emergency message is played, once or twice per user selection depending upon the position of jumper key J1/J2, followed by a standard message that provides further instructions to the called party. By depressing the appropriate key (7, 8 or 9, for example), the called party can either converse with the caller, acknowledge the emergency situation and shut down the emergency dialer, or repeat the emergency message. The middle operation will prevent other telephone numbers from being dialed, although this is optional. Alternatively, one or more other numbers can still be called once. If no response is obtained by the emergency call unit 10 within a prescribed time, for example, 10 seconds, the emergency dialer will hang up and try the next telephone number in the sequence.

Specifically, after the DIAL mode is sensed in step 110, the emergency key E1, E2 or E3 is read in step 180 (FIG. 4A) and it is determined if a valid key has been depressed. Specifically, the emergency key E1, E2 or E3 should be held down for approximately one-half second. This operation applies power via power control 40 to emergency call unit 10. After power is applied, to be a valid key depression, the emergency key must be held for an additional predetermined time period of, for example, 25-50 msec. in order to determine that there has not been an accidental flick or depression of the emergency key. In this regard, microprocessor 16 senses the emergency key held down and then waits for this predetermined time period of 25-50 msec. and checks again if the emergency key is still depressed. If not, it is determined to be an accidental flick of the emergency key, and thereby a false key whereby power is turned off in step 181 in FIG. 4A. If the emergency key is still depressed after the second check, it is determined to be a valid depression of the emergency key, and the process continues to step 182 in which power is supplied to a latch circuit of the microprocessor 16.

Figures 2, 4G:
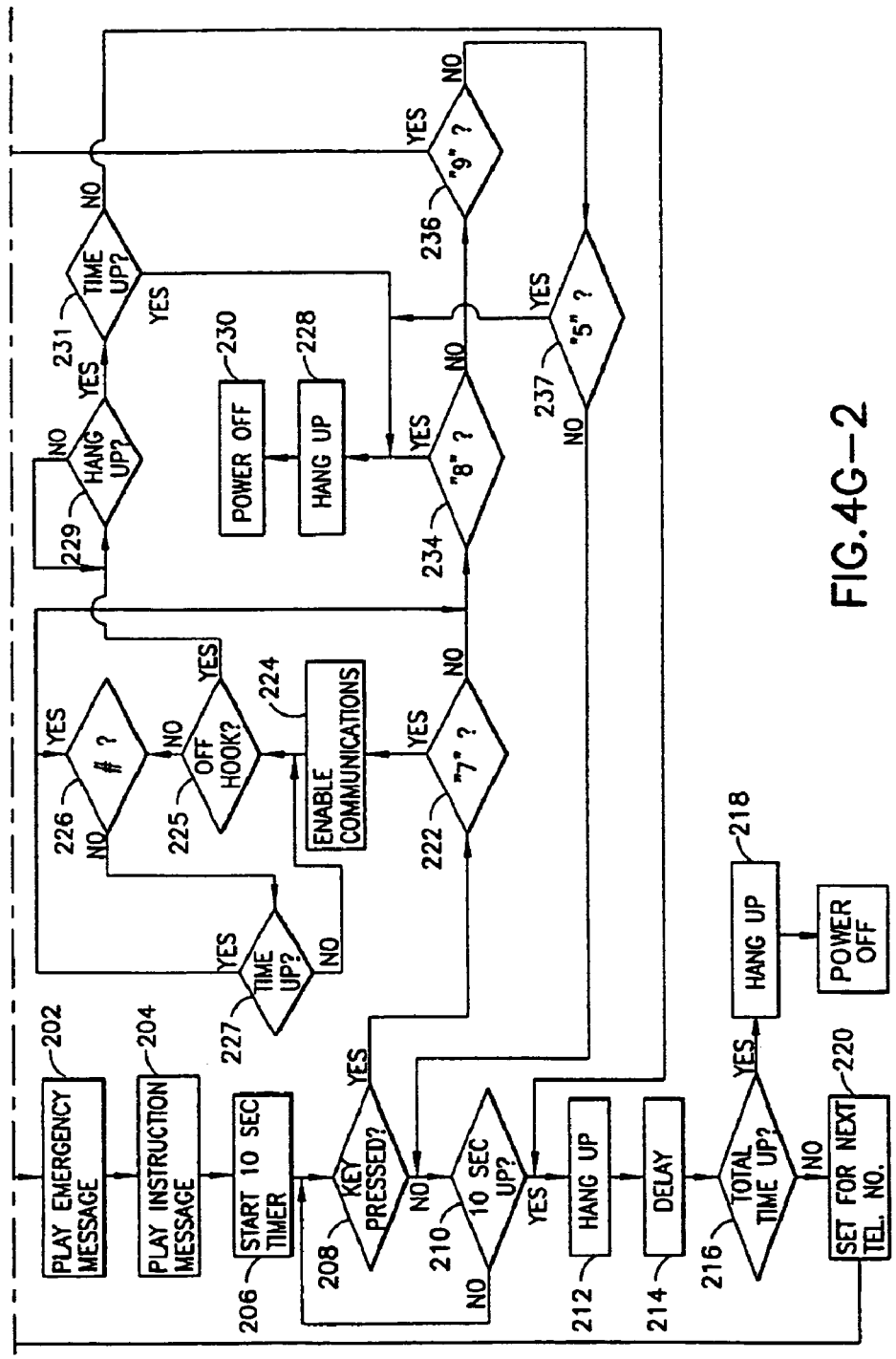

Thereafter, referring to FIG. 4G, microprocessor is set in step 184 to retrieve the first telephone number to be dialed.

It is then necessary for the emergency call unit 10 to detect the presence of a dial tone on the telephone line to enable the outgoing call to the first telephone number to be properly made (the dial tone detect mode), or in the alternative, wait a sufficient amount of time to be certain that an outgoing call can be made while not taking steps to first detect the presence of a dial tone (the delay mode). The same analysis applies each and every time the emergency call unit 10 is preparing to dial a subsequent telephone number. The first situation is shown in the flow chart in FIG. 4G while the second situation is shown in the flow chart in FIG. 4H.

In the first situation, emergency call unit 10 provides an off hook condition in step 185 to obtain a dial tone. Then, there is a delay of one second in step 186, followed by the start of a five second timer in step 188. It is then determined if there is a dial tone in step 190. If not, it is determined in step 192 if the five second time period has expired. If not, the process returns to step 190. If yes, emergency call unit 10 hangs up in step 194, waits two seconds in step 196, and then returns to step 185.

If a dial tone is detected in step 190, the first telephone number to be dialed in association with the emergency key that has been depressed, is retrieved from memory 32 in step 198, and then, this telephone number is dialed in step 200. Steps 185, 186, 188, 190, 192, 194 and 196 therefore function as a dial tone detect routine which serves to determine the presence of a dial tone on the telephone line.

In the second situation, the delay mode, instead of initially detecting a dial tone to determine the ability of the emergency call unit 10 to effectively make an outgoing call, the emergency call unit 10 is designed to dial each preset telephone number after a sufficient amount of time has elapsed to be certain that an outgoing call can effectively be made, i.e., the telephone line is determined to be clear to make an outgoing call. The delay mode can be programmed into microprocessor 16 instead of or in addition to the dial tone detect mode.

A routine is therefore programmed into the microprocessor 16 to assure that a telephone call will not be initiated by the emergency call unit 10 if the telephone is subject to calling party control (when the previous call has not been effectively terminated by the calling party) and if a telephone call is incoming.

Regarding the first criteria, during telephone usage, there is a possibility that an outgoing call cannot be made because a previously completed call has not been effectively terminated. For example, if a telephone call is made to the line on which the emergency call unit 10 is connected and is answered on an extension, when the extension phone is subsequently hung up, a telephone connection can be re-established with the other party for a period of time. Similarly, if a telephone call on that line is answered by an answering machine, when the answering machine finishes its operation and hangs up, but the calling party does not hang up, the telephone connection can be re-established for a period of time.

The reason for the telephone connection being re-established on the telephone line after the extension phone is hung up or the answering machine finishes its operation is because the telephone company's central office allows a calling party control over the call ("calling party control"). In the extension phone situation, if the calling party does not hang up, then when a phone or device associated with the same line as the extension phone, or even the extension phone itself, seizes the line to make a call after the extension phone has been hung up, the connection to the calling party will be re-established. In the answering machine situation, if the calling party does not hang up, then when a phone or device associated with the same line as the answering machine seizes the line to make a call after the answering machine finishes its operation, the connection to the calling party will be re-established.

Indeed, the central office may not disconnect the called party from the line for a period of time up to sixteen seconds so that at any time during these sixteen seconds, if a telephone or device connected to the line to which the called party was connected attempts to seize the line, the call can be resumed (as if it was never interrupted). For the sake of simplicity, a sixteen second time period will be used below; however, the time period can be anywhere from about eight second to about twenty seconds, as determined by the telephone company.

The routine programmed into the microprocessor 16 provides for a delay in the dialing routine which is at least equal to the time period set by the telephone company to allow a called party to resume a call. Specifically, with reference to FIG. 4H which shows a non-limiting flow chart of one manner to incorporate a delay into the dialing routine, the microprocessor 16 of the emergency call unit 10 is set in step 184 for the first telephone number to be dialed. Emergency call unit 10 then issues a local audio and/or visual alarm in step 250. A timer is started in step 252 to keep track of a delay time before the expiration of which a telephone number will not be dialed. Next, in step 254, the telephone line is checked to determine if all of the telephones and devices connected to the phone line are on hook, i.e., the "On Hook" condition. The emergency call unit 10 will continuously check until an "On Hook" condition is detected. If a device connected to the phone line is off-hook, the timer will be restarted in step 252.

When the "On Hook" condition is detected, the timer is checked in step 256 for the sixteen (16) second delay or time out limit (the exact duration of this delay is variable depending on the delay set by the telephone company). If the time limit has not yet been reached, the emergency call unit 10 looks for the standard ring signal in step 258. If no ring signal is detected, the unit returns to the "On Hook" check in step 254, and the process continues until an "On Hook" condition is detected and there is a ring signal or an "On Hook" condition is detected and sixteen seconds have elapsed.

This part of the delay routine prevents the emergency call unit 10 from attempting to initiate a call during the sixteen second delay period during which an attempt at making a call (by seizing the line in preparation for an outgoing call) after a previous call was not terminated by the calling party will be construed as an attempt to resume the previous call.

Moreover, this sixteen second delay is further required to account for a situation in which a telephone or other device connected to the line to which the emergency call unit 10 is also connected has answered a call. In this case as well, if the telephone line is seized to make an outgoing call within sixteen seconds of the termination of the previous call, then the previous call will resume. Thus, the sixteen second delay is always applied to ensure that there is no possibility to resume a previous call.

Once a sixteen second delay incorporated by microprocessor 16 has elapsed, it must further be assured that there is no incoming call since if the emergency call unit 10 attempts to seize the line after the sixteen second delay while a call is incoming, it would inadvertently "answer" the incoming call.

Therefore, the emergency call unit 10 is preferably designed via programming of the microprocessor 16 in the delay mode to monitor the telephone line for a period of silence greater than the period of silence in the ring signal sequence indicative of an incoming call, which is typically a ring signal of four second off sequence following a two second on sequence for a total ring signal sequence of six (6) seconds. If there is a period of silence larger than the four second quiet period with the six second ring signal sequence, it is fairly certain that there is no incoming call. The period of silence within each ring signal sequence can be altered to a different time period depending, for example, on the ring signals used in the location in which the emergency call unit 10 is used and the configuration of telecommunications equipment operating the telephone line to which the emergency call unit 10 is connected. The period of silence is typically four seconds so that a period of silence greater than four seconds is indicative of the absence of an incoming call. For the sake of simplicity, a six second period of silence or delay will be used in the description below.

To implement this six second delay, after the sixteen second delay described above to prevent resumption of a previous call in view of calling party control, the emergency call unit 10 starts a timer in step 260 whose limit is six seconds. Similarly, if a ring signal has been detected in step 258, the unit starts the same six second timer. Next, in step 262, the emergency call unit 10 checks the telephone line to determine if any phone or device connected to the telephone line is off hook, i.e., the "Off Hook" condition. If the phone line is in the "Off Hook" condition, the timer is restarted in step 260.

The emergency call unit 10 will continuously check until an "On Hook" condition is detected. When the "On Hook" condition is detected, the timer is checked in step 264 for the six second time limit. If the time limit has not yet been reached, the unit looks for the standard ring signal in step 266. If no ring signal is detected, the unit returns to the "Off Hook" check, and the process continues until an "On Hook" condition is detected and there is no ring signal for six seconds. If a ring signal is detected prior to the expiration of the six second delay, the six second timer is restarted, and the sequence of On Hook determination, timer restart and ring signal determination is repeated.

If the time limit is up (without having detecting a ring signal and without having detected an "Off-Hook" condition), the emergency call unit 10 now goes Off Hook in step 268, waits for a specified delay time to allow the dial tone to appear in step 270, and then continues by retrieving the phone number as shown in step 198 and dialing the retrieved number in step 200 (after which the method proceeds as described below with reference to FIG. 4G).

Referring back to FIG. 4G, after the first telephone number has been dialed in step 200 (having proceeded along the flow chart shown in FIG. 4G or the alternative shown in FIG. 4H), it is then detected in step 201 whether the pager flag has been set. If no, the process continues to step 202. If yes, the process continues to step 203 where the system waits a predetermined amount of time, for example, up to five seconds to account for pager beeps. Then, the caller's telephone number stored in location 6 is sent to the pager number that has been dialed in step 205. The process then continues to step 212.

In step 201, if the pager flag is not set, the appropriate pre-recorded emergency message from message storage unit 20 is read out in step 202 according to one of the three methods discussed above, and may occur even while the telephone being dialed is still ringing. Preferably, the pre-recorded message is played once for each telephone number, and this is determined by the jumper key J1/J2, so that the person picking up the telephone merely needs to continue listening to hear the message. In this manner, there is no delay from the time that the person answers the telephone. Generally, a message will start out with words such as "EMERGENCY, EMERGENCY", followed by the caller's pre-recorded message, so that the person picking up will not miss essential parts of the message.

The advantage of sending the message while the telephone is still ringing is that there is no need for any detection circuit to detect whether the called telephone is answered, thereby greatly simplifying the circuitry and rendering system 8 less costly.

However, it is also possible for system 8 to be set up so that the message is only played after a telephone is picked up or after an answering machine answers, and this would require such detection circuitry, as discussed above.

Following playback of the recorded emergency message, a second instruction message is played back in step 204, which instructs the called person as to various options that can be taken by depressing appropriate keys. In the event of a pager number being dialed, the caller's telephone number is sent to the pager instead of the emergency message in step 202 and the instruction message in step 204. A ten second timer is then started in step 206 to give the called person an opportunity to take any of the various actions. In step 208, it is determined if the called person has depressed a key on the called telephone unit. If no, it is determined if the ten second time period has expired in step 210. If no, the process returns to step 208. If yes, emergency call unit 10 hangs up in step 212, and waits for a delay time in step 214. It then determines in step 216 if a total time period, for example, one-half hour has elapsed. If yes, it hangs up in step 218. If no, it sets up microprocessor 16 to dial the next telephone number in step 220. Thereafter, the process returns to step 185. Alternatively, steps 216, 218 and 219 can be eliminated, and the system can dial forever until someone disables the system.

Figure 4H:
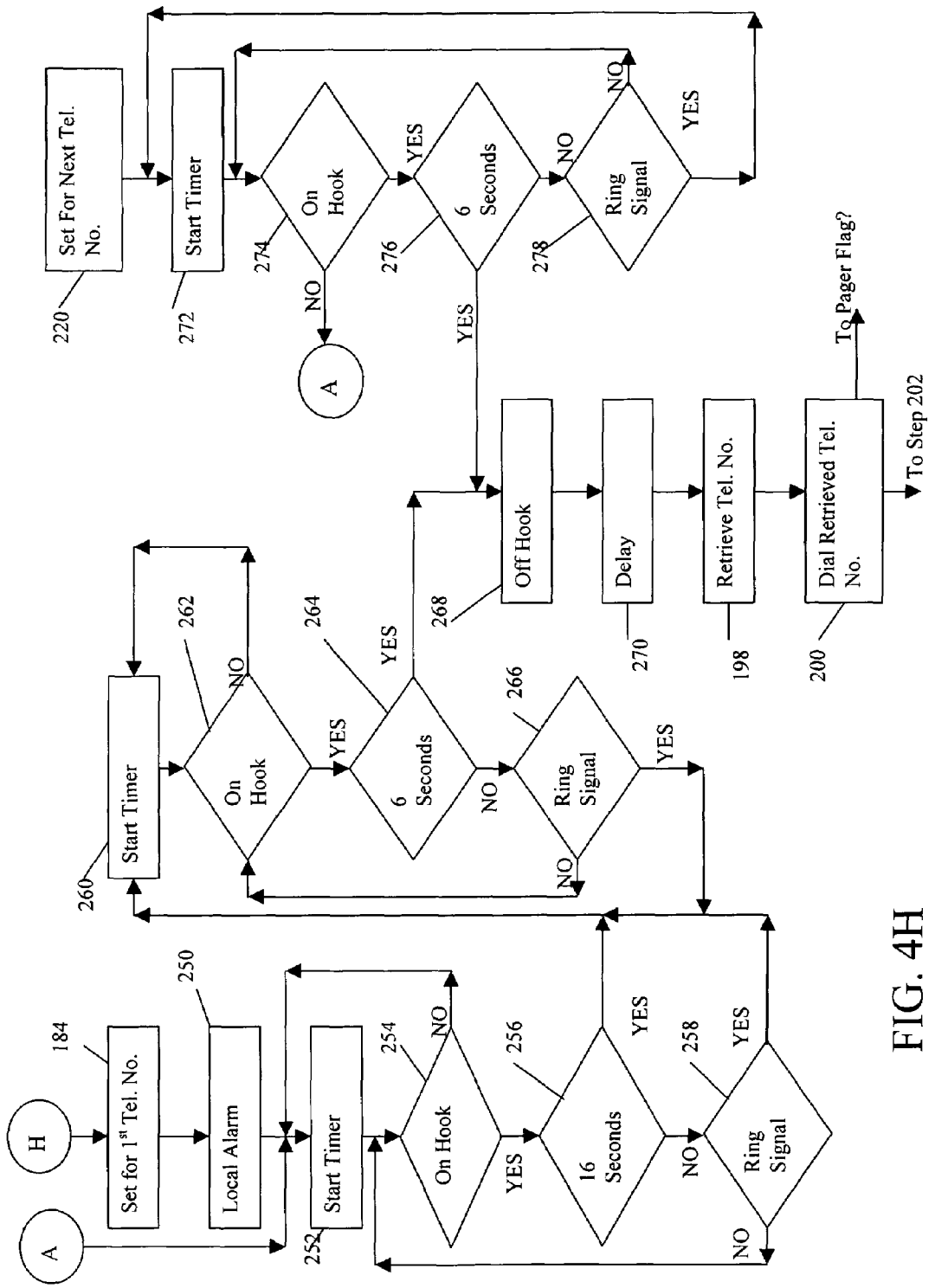

Instead of the process returning to step 185 after setting the microprocessor 16 to dial the next telephone number according to the flow chart shown in FIG. 4G (using a dial tone detection routine), the process can return to step 272 according to the flow chart shown in FIG. 4H (wherein no initial dial tone detection is used). As shown in FIG. 4H, after setting the microprocessor 16 to dial the next telephone number in step 220, the emergency call unit 10 starts a timer in step 272 whose limit is six seconds (or any period of time greater than the four second period of silence within a six second standard ring signal-again, for the sake of simplicity, a six second delay will be used). Next, in step 274, the emergency call unit 10 checks the telephone line to determine that any and all telephones and devices connected to the telephone line are on hook, i.e., the "On Hook" condition. If a telephone or device is not in the On Hook condition, the process proceeds to step 252 to provide for the sixteen second delay and subsequent six second delay to assure that a previous call will not be resumed and an incoming call will not be answered.

When the "On Hook" condition is detected in step 274, the timer is checked in step 276 for the expiration of the six second time limit. If the time limit has not yet been reached, the emergency call unit 10 looks for the standard ring signal in step 278. If no ring signal is detected, the emergency call unit 10 returns to the "On Hook" check, and the process continues until an "On Hook" condition is detected and there is no ring signal for six seconds. If a ring signal is detected, the six second timer is restarted in step 272, and the sequence of On Hook determination, timer restart and ring signal determination is started again.

If the time limit is up, the unit goes Off Hook in step 268, waits for a specified delay time to allow the dial tone to appear in step 270, and then continues by retrieving the phone number as shown in step 198 and dialing the retrieved number in step 200. The process continues as described above.

Referring back to FIG. 4G, if a remote key has been operated by the called person in step 208, it is first determined if the depressed key is the numeric key "7", in step 222. If yes, microprocessor 16 connects emergency call unit 10 for communication between the called person and the caller via speaker 26 and microphone 58, in step 224, for a predetermined limited time such as 90 seconds. For example, the called person can then assure the caller that help is on the way. The caller can then pick up the telephone and speak with the called person for as long as the caller desires. If this occurs, an off hook condition exists. It is therefore sensed in step 225 if an off hook condition exists in step 225. If no, the caller can end the communication but not the connection, by pressing the pound (#) key on keypad 30. This is determined in step 226. If the pound (#) key is pressed, the process continues to step 234 discussed hereinafter. If the pound (#) key is not pressed, it is next determined if the predetermined limited time has expired in step 227. If no, the process returns to step 225, and if yes, the process continues to step 234. Alternatively, instead of enabling communications, unit 10 can merely provide a signal such as an audible alarm or the like to the caller to indicate that the called person received the message. Alternatively, the above arrangement can be provided where the caller can speak for 15 seconds, followed by the called party speaking for 15 seconds, and so on.

In step 225, if the caller picks up the telephone, an off hook condition is detected, and the process continues to step 229, where it is determined if the caller has hung up the telephone. If no, a loop is provided back to the input of step 229 to periodically make this inquiry. If the person has hung up, the process continues to step 231 to determine if a predetermined time period of, for example, one-half hour has elapsed. This step is provided in the event that the caller cannot hang up the telephone that is picked up, and more than one-half hour passes when paramedics or others come to the aid of the caller and hang up the telephone. In such case, since the caller has been helped, the system should not start dialing the emergency telephone numbers again, since this would create a false emergency call. Thus, if the time has elapsed, the process continues to step 228 which is discussed hereinafter, to end the call process. If the time has not elapsed, for example, the caller hangs up within the time period, the process continues to step 212, to start dialing other telephone numbers on the list.

In step 222, if it is determined that the numeric key "7" has not been depressed, it is then determined if the depressed key is the numeric key "8", in step 234. If yes, emergency call unit 10 hangs up in step 228, and then powers down the unit in 230 so that no further telephone numbers are dialed. This is because the message has been received by one person who can take action. Alternatively, in a preferred embodiment, rather than powering down, emergency call unit 10 can be programmed to dial the remaining numbers (or one or more further numbers) and leave messages. Preferably, if numeric key "8" is not depressed by any of the called numbers, emergency call unit 10 will continue to dial through all of the numbers more than one time, for example, two, three or more times until an appropriate response is received. The alternative operation limits this to dialing through the telephone numbers only once. Preferably, regardless of which alternative is used when numeric key "8" is depressed, a recognition signal, such as a tone or voice, will be sent to the caller to acknowledge that the message has been received.

In step 234, if it is determined that the numeric key "8" has not been depressed by the called person, it is determined in step 236 whether the numeric key "9" has been depressed. If yes, the process returns to step 202 in order for the played messages to be re-played for the called person.

If not, the process proceeds to step 237 where it is determined if the numeric key "5" has been depressed by the caller. If yes, the process returns to step 228 to shut the system down. If no, the process returns to step 210.

It is further noted that, at any time in the CALL MODE, if the caller picks up the telephone to talk to a called person or to call a person in a normal manner, the system is disabled since there is no dial tone in step 190, whereby emergency call unit 10 cannot dial any telephone number.

As a further alternative, the system provides the option of sending out a current message before the emergency message. This would be provided by a 4-5 seconds delay before the emergency message is sent. Thus, for example, the caller can recite "My child just swallowed a bone" and hang up, whereupon the current message followed by the emergency message would be sent to all dialed numbers.

As discussed above, emergency call unit 10 and telephone unit 14 can be separate connected units, or alternatively, can be a single integral unit. Further, emergency call keys E1, E2 and E3 can be activated from the emergency call unit 10 or from pendant 46.

Another feature of an emergency call unit 10 in accordance with the invention is designed for situations where a person is using a speakerphone feature on the emergency call unit 10 or on a telephone associated with the emergency call unit 10, and then presses an emergency key. In this case, the microprocessor 16 is programmed to immediately terminate the call by turning the speakerphone feature off and then initiate one of the dialing sequences described above. This feature can be applied to an emergency call system independent from the dialing sequences described above, i.e., on connection with any type of dialing sequence.

In the delay mode, the microprocessor 16 would wait sixteen seconds to assure that the call for which the speakerphone feature was being used was terminated and could not be re-established and then six seconds to assure that there are no incoming calls. To possibly eliminate the requirement of waiting sixteen seconds when the call was an outgoing call initiated by the person who is initiating the emergency call unit 10, the microprocessor 16 can be designed to detect whether the call is incoming or outgoing. For an incoming call, the sixteen second wait is required to account for calling party control whereas for an outgoing call, the sixteen second delay is not required since turning the speakerphone feature off or hanging up the handset ends calling party control over that call. As such, if the call was outgoing and made using the emergency call unit 10, as soon as the person presses the emergency key, the emergency call unit 10 can be programmed to proceed directly to the delay for incoming calls.

Another feature that can be incorporated into the emergency call unit 10 when incorporated into a telephone base unit is that if that telephone is off hook when an emergency key is pressed, the microprocessor 16 can be designed to detect the off hook condition and electronically re-connect the telephone so that an outgoing call can be made. The microprocessor 16 would bypass the handset and disregard the fact that the handset is not connected to the telephone base. This feature is particularly useful since in prior art devices, an off hook telephone prevented use of the system. This feature can be applied to an emergency call system independent from the dialing sequences described above, i.e., on connection with any type of dialing sequence.

Another feature that can be incorporated into the emergency call unit 10 in any of the variations discussed above is a reset feature which, after the preset telephone numbers are all dialed, resets the emergency call unit 10 to allow for incoming calls and specifically, when the telephone is off hook (i.e., the handset is not in its proper position on the base), activates the speakerphone to enable reception of incoming calls. Control over the speakerphone can be accomplished via programming of the microprocessor 16. Applying this feature, even if the handset is off hook during the dialing sequence, once the numbers in the list have been dialed, incoming calls can be received with the ring signal sequence being heard via the speakerphone. This overcomes the problem of an individual leaving the handset off the hook, which would otherwise prevent them from receiving incoming calls responsive to the outgoing emergency messages.

Thus, an emergency call system according to the present invention eliminates the requirement for a central station, and eliminates the requirement for a separate wiring of the caller's home. Also, emergency call system can be used with a conventional telephone line. With such an arrangement, emergency call system is inexpensive and easy to make, install and operate.

As part of the description above relating to the delay mode for dialing using emergency call unit, a routine is described which can more generally be used whenever it is desired to make an outgoing call without detecting a dial tone. This dialing routine can be implemented in a microprocessor of a communications unit mounting in a housing in a similar manner as the routine for the delay mode is implemented in microprocessor 16. However, the dialing routine, and dialer implementing it, is not limited to use with an emergency call system and can be used for any other telecommunications device.

Such a dialer in accordance with the invention for making an outgoing call would basically comprise a housing and a communications unit arranged therein and coupled to the telephone line. The communications unit includes a microprocessor arranged to receive a command to initiate an outgoing call on the telephone line to a telephone number, without first detecting a dial tone, delay dialing of the telephone number for a period of time to assure that the outgoing call can be made on the telephone line, and then dial the telephone number after the delay. The microprocessor generates the delay using the flow chart shown in FIG. 4H, first checking to make sure the previous call is not subject to calling party control and then making sure that there is no incoming call. Details of the manner in which these delays are implemented are described above.

Having described a specific preferred embodiment of the invention with reference to the accompanying drawings, it will be appreciated that the present invention is not limited to that precise embodiment, and that various changes and modifications can be effected therein by one of ordinary skill in the art without departing from the scope or spirit of the invention as defined by the appended claims.

What is claimed is:

1. An emergency call system by which a caller can automatically call a plurality of other parties to leave an emergency message, including an emergency call unit comprising:
   a memory for storing a plurality of telephone numbers to be called and at least one emergency message,
   an input/output device for connecting said emergency call unit for making a telephone call,
   at least one emergency key, and
   a microprocessor connected with said memory, said at least one emergency key and said input/output device and arranged to:
   control storage of the plurality of telephone numbers to be called and the at least one emergency message in said memory,
   set each telephone number to be dialed in sequence,
   automatically, delay dialing of each telephone number for a period of time to assure that an outgoing call can be made on the telephone line, and dial the telephone numbers in sequence upon activation of said at least one emergency key.

2. The emergency call system of claim 1, wherein said microprocessor is arranged to issue an alarm prior to dialing any of the telephone numbers.

3. The emergency call system of claim 1, wherein said microprocessor is arranged to delay the dialing of each telephone number starting from time when telephones and devices connected to the telephone line are determined not to be off hook.

4. The emergency call system of claim 1, wherein said microprocessor generates the delay by:
   starting a first timer,
   checking whether any telephone or device connected to the telephone line is off hook,
   restarting the first timer when a telephone or device is determined to be off hook, and
   when a telephone or device is not off hook, determining whether a first predetermined period of time has elapsed or a ring signal is detected and if not repeating the hook checking step, the timer restarting check and the determination step.

5. The emergency call system of claim 4, wherein the first predetermined period of time is set to a time a telephone company maintaining the telephone line allots for a call to resume after the called party hangs up their telephone.

6. The emergency call system of claim 4, wherein the first predetermined period of time is eight to twenty seconds, preferably sixteen seconds.

7. The emergency call system of claim 4, wherein said microprocessor generates the delay by further:
   monitoring the telephone line for silence after determining whether the first predetermined period of time has elapsed or the ring signal has been detected and enabling each the telephone number to be dialed, without first detecting a dial tone, only after a period of silence is detected which is greater than the quiet period within a ring signal sequence indicative of an incoming call.

8. The emergency call system of claim 4, wherein after a determination is made that the first predetermined period of time has elapsed or the ring signal has been detected, said microprocessor generates the delay by further:
   starting a second timer,
   checking whether any telephone or device connected to the telephone line is off hook,
   restarting the second timer when a telephone or device is determined to be off hook,
   when a telephone or device is not off hook, determining whether a second predetermined period of time has elapsed and if not determining whether a ring signal is present, and
   when a ring signal is not present, repeating the hook checking step and the determination step.

9. The emergency call system of claim 8, wherein when the second period of time has elapsed, said microprocessor places the emergency call unit in an off hook condition, retrieves one of the telephone numbers and then dials it.

10. The emergency call system of claim 8, wherein when the ring signal is present, said microprocessor generates the delay by further repeating the second timer starting step, the hook checking step and the determination step.

11. The emergency call system of claim 8, wherein when the second period of time is based on a quiet period within a ring signal sequence and is typically six seconds.

12. The emergency call system of claim 4, wherein between telephone calls, said microprocessor is arranged to:
   start a third timer,
   check whether any telephone or device connected to the telephone line is off hook,
   restart the first timer when a telephone or device is determined to be off hook,
   when the telephones and devices are on hook,
      determine whether a third predetermined period of time has elapsed and if not determine whether a ring signal is present,
      when a ring signal is not present, repeat the hook checking step and the determination step,
      when the third period of time has elapsed, place the emergency call unit in an off hook condition, retrieve the following one of the selected telephone numbers and dial it,
      when the ring signal is present, repeat the third timer starting step, the hook checking step and the determination steps.

13. The emergency call system of claim 1, wherein said microprocessor generates the delay by:
   determining whether a first predetermined period of time has elapsed or a ring signal is detected and enabling each of the telephone numbers to be dialed, without first detecting a dial tone, only after the first period of time has elapsed or the ring signal has been detected.

14. The emergency call system of claim 13, wherein said microprocessor further generates the delay by:
   monitoring the telephone line for silence after determining whether the first predetermined period of time has elapsed or the ring signal has been detected and enabling each of the telephone numbers to be dialed, without first detecting a dial tone, only after a period of silence is detected which is greater than the quiet period within a ring signal sequence indicative of an incoming call.

15. The emergency call system of claim 1, wherein said microprocessor is further arranged to:
   detect each ring-back from each dialed telephone number,
   start a transmission of the at least one emergency message to the dialed telephone number to automatically advise of an emergency after a predetermined time after the telephone number has been dialed and no busy signal has been detected during a predetermined time period, and
   restart the transmission of the at least one emergency message to the dialed telephone number to automatically advise of an emergency after detecting each ring-back from each of the dialed telephone numbers.

16. The emergency call system of claim 1, wherein said microprocessor is further arranged to turn a speakerphone off when the telephone is on hook and a call is in progress on the telephone line upon activation of said at least one emergency key, and then proceed with the delay in dialing.

17. The emergency call system of claim 1, wherein said microprocessor is arranged to detect an off hook condition upon activation of said at least one emergency key and electronically bypass the handset and then proceed with the delay in dialing.

18. The emergency call system of claim 1, wherein said microprocessor is arranged to detect an off hook condition and upon detection of the off hook condition, activate a speakerphone after completion of the dialing sequence to enable reception of incoming calls.

19. An emergency call system by which a caller can automatically call a plurality of other parties to leave an emergency message, including an emergency call unit comprising:
   a memory for storing a plurality of telephone numbers to be called and at least one emergency message,
   an input/output device for connecting the emergency call unit for making a telephone call,
   a first speaker and a first microphone through which a caller can communicate with the called party,
   a second speaker and a second microphone through which a called party can communicate with the caller,
   at least one emergency key, and
   a microprocessor connected with said memory, said at least one emergency key and said input/output device and arranged to:
   control storage of the plurality of telephone numbers to be called and the at least one emergency message in said memory,
   set each telephone number to be dialed in sequence,
   automatically, delay dialing of each telephone number for a period of time to assure that an outgoing call can be made on the telephone line, and dial the telephone numbers in sequence upon activation of said at least one emergency key.

20. The emergency call system of claim 19, wherein said microprocessor generates the delay by:
   determining whether a first predetermined period of time has elapsed or a ring signal is detected and enabling each of the telephone numbers to be dialed, without first detecting a dial tone, only after the first period of time has elapsed or the ring signal has been detected.

21. The emergency call system of claim 19, wherein said microprocessor further generates the delay by:
   monitoring the telephone line for silence after determining whether the first predetermined period of time has elapsed or the ring signal has been detected and enabling each of the telephone numbers to be dialed, without first detecting a dial tone, only after a period of silence is detected which is greater than the quiet period within a ring signal sequence indicative of an incoming call.

22. The emergency call system of claim 19, wherein said microprocessor is further arranged to:
   start a transmission of the at least one emergency message to each of the dialed telephone numbers to automatically advise of an emergency,
   thereafter permit oral communication between the caller and the called party through said speakers and microphones, and
   permit listening by the called party upon activation of one key by the called party and permitting speaking by the called party upon activation of another key by the called party.

* * * * *